July 28, 1931.  I. I. SIKORSKY  1,816,130
AIRCRAFT INCLUDING WING PANEL AND FUEL TANK ASSEMBLY FOR SAME
Original Filed June 7, 1929   3 Sheets-Sheet 1
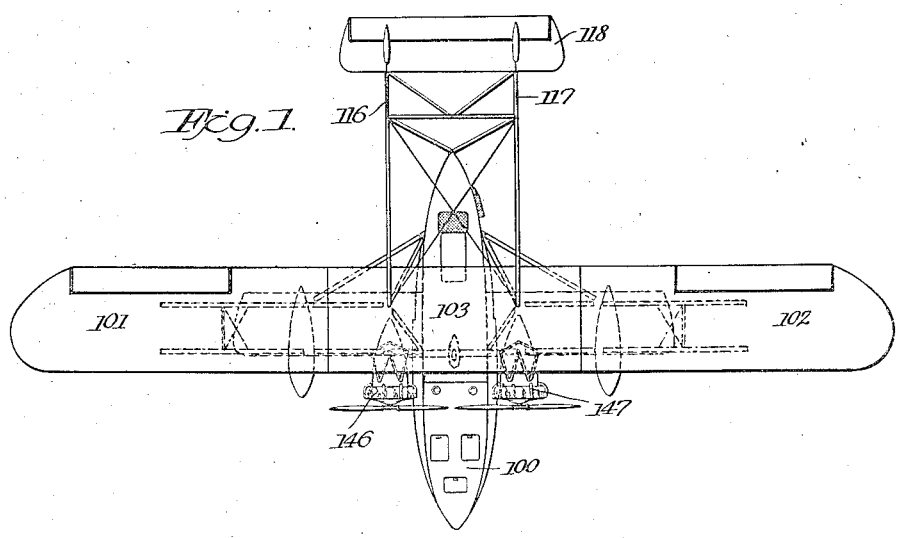
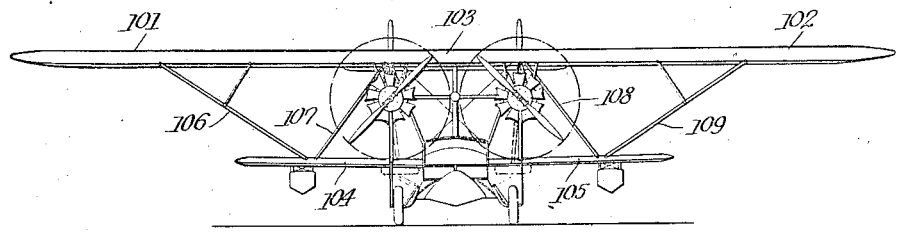
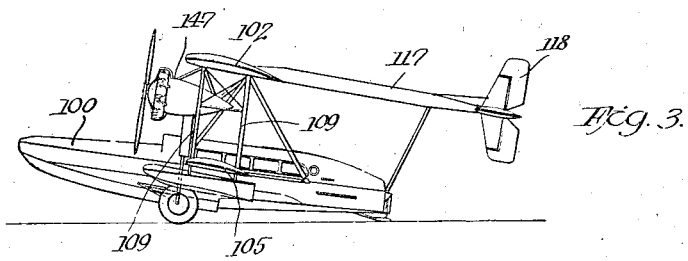
Igor I. Sikorsky
INVENTOR
BY
ATTORNEY July 28, 1931.  I. I. SIKORSKY  1,816,130
AIRCRAFT INCLUDING WING PANEL AND FUEL TANK ASSEMBLY FOR SAME
Original Filed June 7, 1929   3 Sheets-Sheet 2
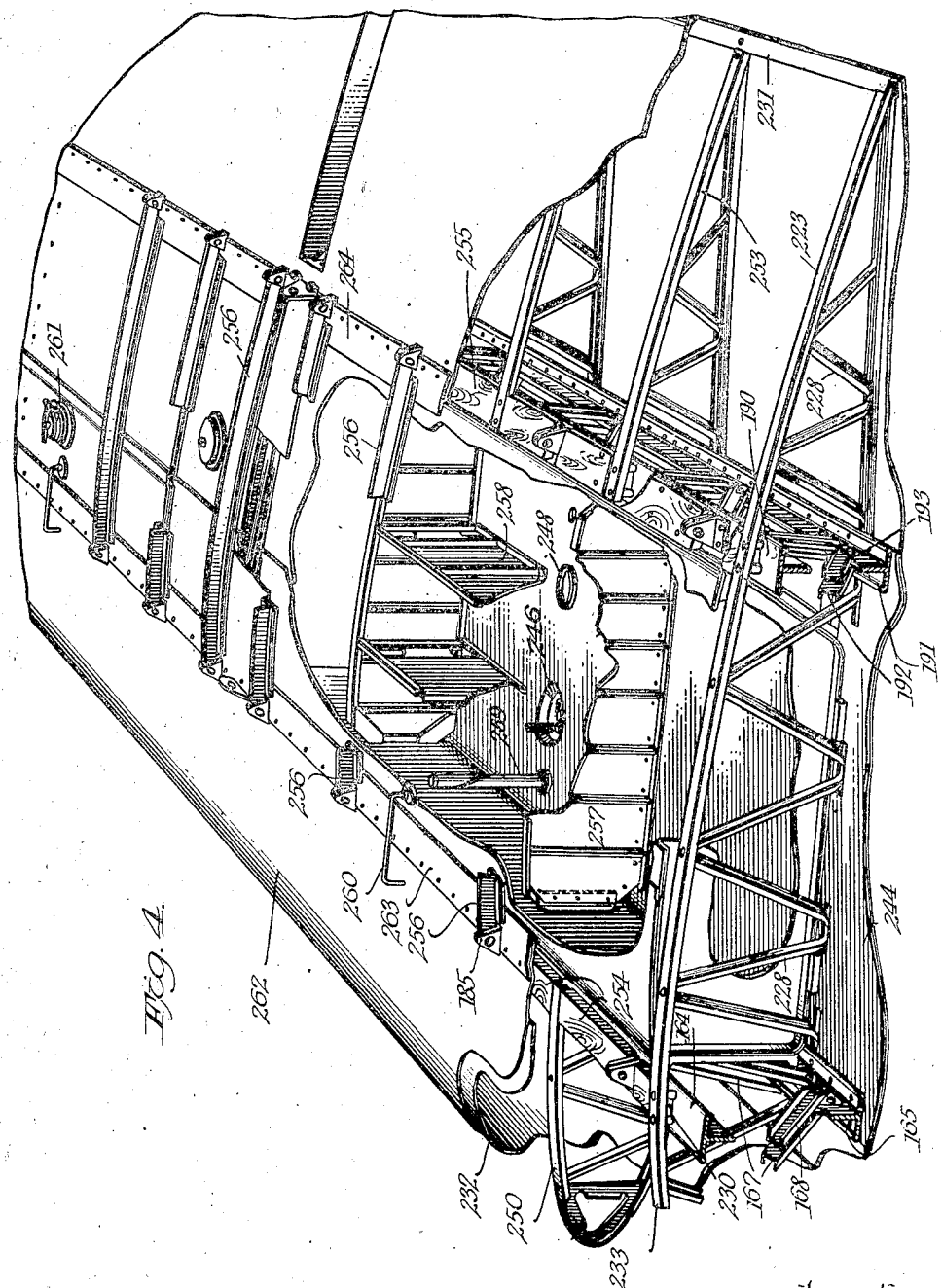
Inventor
Igor I. Sikorsky
Attorney

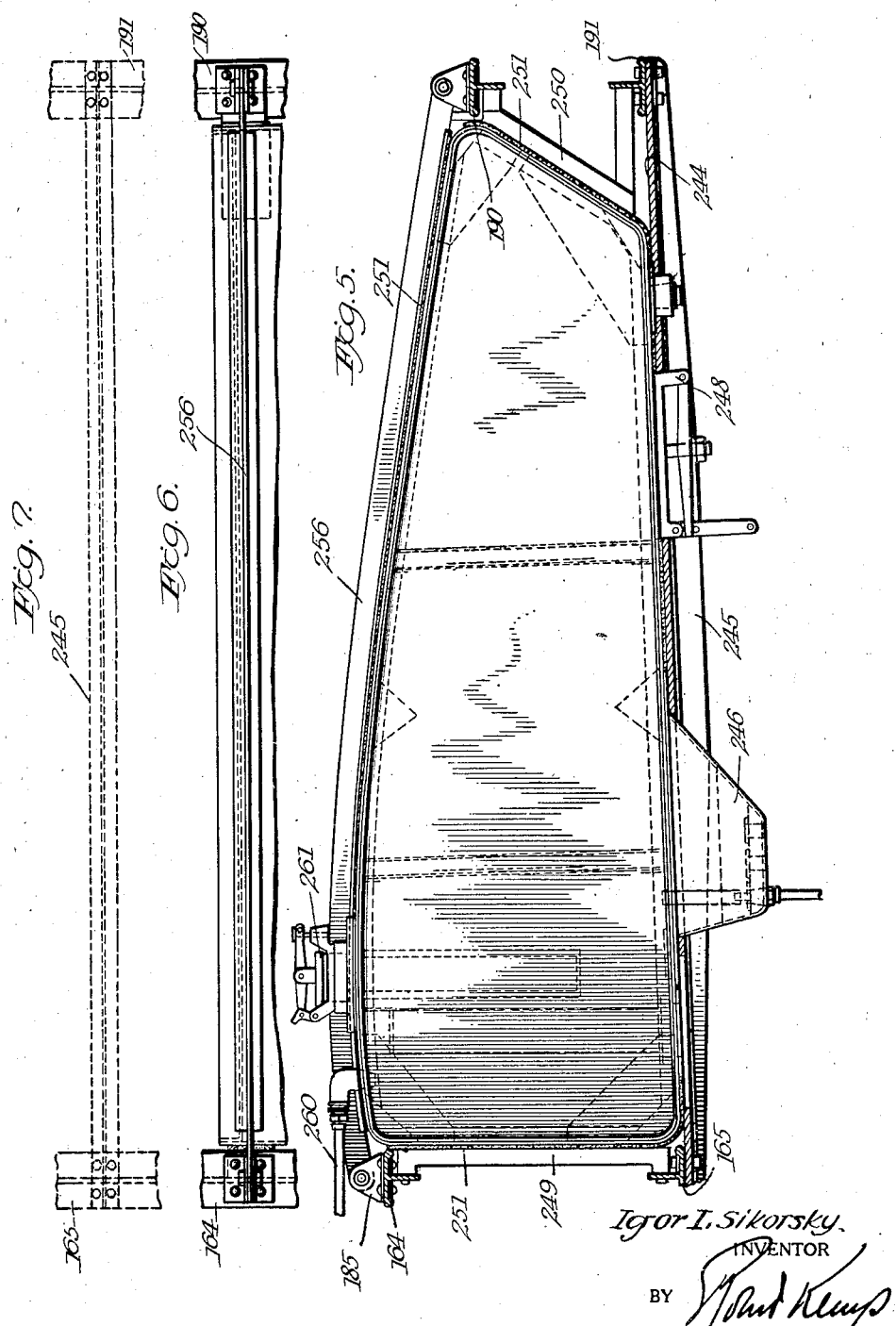

Patented July 28, 1931

1,816,130

UNITED STATES PATENT OFFICE

IGOR I. SIKORSKY, OF LORDSHIP, CONNECTICUT, ASSIGNOR TO SIKORSKY AVIATION CORPORATION, OF WILMINGTON, DELAWARE, A CORPORATION OF DELAWARE

AIRCRAFT INCLUDING WING PANEL AND FUEL TANK ASSEMBLY FOR SAME

Original application filed June 7, 1929, Serial No. 369,113. Divided and this application filed August 12, 1929. Serial No. 385,220.

The present invention relates to improvements in aircraft of the amphibian type and especially to the arrangement and construction of tanks for the liquid fuel of the motors or engines of an amphibian.

The present case is a division of an earlier application Serial No. 369,113, filed June 7, 1929, and while the invention is capable of use with various forms of amphibian aircraft, it has been particularly designed for use with a multi-motor amphibian, and such an embodiment is illustrated in the accompanying drawings.

In the drawings,

Figure 1 is a plan view of a multi-motor amphibian having an embodiment of the present invention applied thereto.

Figure 2 is a front elevation of the same.

Figure 3 is a side elevation.

Figure 4 is a transverse vertical section through the center portion of the main plane, the parts being broken away to better disclose features of the fuel tank structure.

Figure 5 is a transverse section, on a larger scale, through the fuel tank.

Figure 6 is a plan of a portion of Figure 5.

Figure 7 is a similar view showing in dotted lines certain structural elements outlying the tank.

Referring to the drawings, in the several views of which corresponding parts are designated by the same reference character, the body-boat of the amphibian is designated 100 and shown as being supported beneath a main plane comprising right and left wings 101, 102, respectively, and a center section 103.

Lower wings 104 and 105 project laterally from the body-boat beneath the upper or main plane, and the two sets of planes are interconnected and supported by suitable truss struts preferably including duplicate sets of struts 106, 107, 108 and 109.

Further the several planes and body-boat are connected by additional struts, and the amphibian illustrated is provided with outriggers 116 and 117, which project rearwardly from the center section of the main plane and support at their rear ends an empennage assembly designated 118.

As the features of the invention hereinafter described and claimed may be embodied with other forms of amphibian aircraft than the one shown, it is not thought to be necessary to describe the structure of the latter in further detail.

Two engines 146, 147 are suspended from the center section of the main plane, and the tanks for supplying fuel and oil to such engines are disposed in a novel manner in said center section of the main plane.

Referring particularly to Figures 4 and 5, the center section of the main plane includes front and rear spars connected by suitable compression members, and within the space between said spars are arranged the fuel and oil tanks.

The detail construction of the main plane and particularly that of the front and rear spars of the center section thereof form the subject matter of another application.

For the purposes of the present case, it is believed to be sufficient to note that the front spar comprises upper and lower bulb-flanged T-bars 164 and 165, the vertical flanges of which are connected by angle iron truss members 167, 168.

The rear spar of the center section of the main plane is formed by vertically spaced angle irons 190, 192, similar in cross-sectional form to the bars 164, 165 of the front spar, and the opposed vertical flanges of these top and bottom bars 190, 191 are connected by two sets of truss members 192, 193.

The center section of the main plane also includes continuous ribs 223 which project forward and rearward from the front and rear spars, and are raised and strengthened by truss members 228. The rear ends of all of the rib members 223 are connected by a V-section binding strip 231, and the nose portions or forward ends of said members are enclosed in a nose box 232.

Blocks 230 of wood or other suitable material are preferably inserted between the ribs 223 and the top bar 164 of the front spars of the plane.

As previously noted and as shown clearly in Figures 4 and 5, the fuel tanks are arranged in the space between the front and rear spars, the bottom thereof being formed by or resting on a metal plate 244 which connects the lower bars 165 and 191 of the front and rear spars, respectively. This bottom or tank supporting plate is reinforced on its under surface by a suitable number of angle iron strips 245.

The invention contemplates providing a plurality of tanks within the space referred to and the front wall of each tank bears against wooden chocks 249 which, as shown particularly in Figure 5, are securely connected to the vertical members of the top and bottom bars 164, 165 of the front spar.

The rear wall of each tank bears against a similar chock member 250 which is secured to the vertical flanges of the top and bottom members 190, 191 of the rear spar. Preferably, as shown in Figure 5, this rear wall and cooperating chock are inclined forward from the top to the bottom of the tank.

The structure is further strengthened by angle irons 256 which extend across the top of the tank and are connected at their ends to lugs 185 rising from the top members of the front and rear spars. Strips or sheets 251 of suitable cushioning material are shown as interposed between the top, bottom and end walls of the tank and the adjacent frame parts.

The top of the tank is of substantially aerofoil contour, the contour being completed by nose members 252 and tail members 253 which are respectively connected to the front and rear spars before referred to. As shown, wooden filler blocks 254, 255 are provided on the top and bottom bars of the spars to maintain the members 252 and 253 in the desired spaced relation.

As shown, the covering 262 of the center section of the main plane, within which the fuel tanks are arranged, extends over the aforesaid spacing blocks 254 and 255, and is secured thereto by reinforcing strips 263 and 264.

Interiorly each of the fuel tanks is provided with vertically extending baffles 257 and 258 extending substantially at right angles to each other for the purpose of preventing surging of the liquid in the tank.

Each tank is, of course, provided with suitable control mechanism, the reference numeral 259, for example, indicating a gauge operating element, 260 a vapor escape tube, and 261 a filling opening which is provided with a suitable cap closure.

Further each tank is provided at its bottom with a draw-off well 246 which projects below the supporting plate 244, and with a dump valve 248 by operating which the contents of the tank may be instantly discharged.

Having thus described my invention, what I claim as new is:

1. In an amphibian, a body boat member, retractable landing mechanism fastened to said body boat, a main plane section above said body member in symmetrical relation to the longitudinal axis of said body member and fastened thereto, said plane including front and rear spar members, compression members extending between said spar members at intervals, means connecting the lower portions of said spar members, and tanks supported on said means between the compression members directly above said retractable landing gear mechanism fastened to said body boat member.

2. In an amphibian, a body boat member, retractable landing mechanism fastened to said body boat, a main plane above said body member in symmetrical relation to the longitudinal axis of said body member and fastened thereto, said plane including front and rear spar members, compression members extending between said spar members at intervals, means connecting the lower portions of said spar members, chocks on said spar members having upwardly divergent opposed faces, and tanks fitting between said chocks intermediate the compression members and supported on said connecting means directly above said retractable landing gear mechanism fastened to said body boat member.

3. In an amphibian, a body boat member, retractable landing mechanism fastened to said body boat, a main plane above said body member in symmetrical relation to the longitudinal axis of said body member and fastened thereto, said plane including front and rear spar members, compression members extending between said spar members at intervals, tanks in the compartments formed by the spars and compression members, the upper surfaces of said tanks being of substantially aerofoil contour, and nose and tail section contour members secured respectively to the front and rear spar members directly above said retractable landing gear mechanism fastened to said body boat member.

4. In an amphibian, a body boat member, retractable landing mechanism fastened to said body boat, a main plane above said body member in symmetrical relation to the longitudinal axis of said body member and fastened thereto, said plane including front and rear spar members, compression members connecting said spar members at intervals, a tank in the compartment formed by said spars and compression members, a plate connecting the lower portions of the front and rear spar members and supporting the tank, and strips underlying said plate and secured at their ends to the spar members directly above said retractable landing gear mechanism fastened to said body boat member.

5. In an amphibian, a body boat member, retractable landing mechanism fastened to said body boat, a main plane above said body member in symmetrical relation to the longitudinal axis of said body member and fastened thereto, said plane including front and rear spar members, compression members connecting the spar members at intervals, tanks in the compartments formed by said spars and compression members, a plate connecting the lower portions of the front and rear spar members and supporting the tanks, and strips overlying the tops of the tanks and secured at their ends to said spar members directly above said retractable landing gear mechanism fastened to said body boat member.

Signed at College Point, Long Island, in the county of Queens and State of New York, this 24th day of June, A. D. 1929.

IGOR I. SIKORSKY.